(12) United States Patent
Masuda et al.

(10) Patent No.: US 8,382,404 B2
(45) Date of Patent: Feb. 26, 2013

(54) DRILL

(75) Inventors: Norihiro Masuda, Toyokawa (JP); Wataru Aoki, Nagoya (JP)

(73) Assignees: OSG Corporation, Toyokawa-Shi (JP); BTT Corporation, Nagoya-Shi (JP)

( * ) Notice: Subject to any disclaimer, the term of this patent is extended or adjusted under 35 U.S.C. 154(b) by 1104 days.

(21) Appl. No.: 12/308,581

(22) PCT Filed: Jun. 23, 2006

(86) PCT No.: PCT/JP2006/312624
§ 371 (c)(1),
(2), (4) Date: Dec. 18, 2008

(87) PCT Pub. No.: WO2008/001412
PCT Pub. Date: Jan. 3, 2008

(65) Prior Publication Data
US 2010/0054884 A1 Mar. 4, 2010

(51) Int. Cl.
*B23B 51/02* (2006.01)
(52) U.S. Cl. .......................... 408/230; 408/227
(58) Field of Classification Search .................. 408/227, 408/299, 230; *B23B 51/00, 51/02*
See application file for complete search history.

(56) References Cited

U.S. PATENT DOCUMENTS

| 4,645,389 | A | * | 2/1987 | Maier | 408/227 |
| 4,679,971 | A | * | 7/1987 | Maier | 408/145 |
| 5,716,172 | A | | 2/1998 | Nakamura et al. | |
| 5,967,712 | A | * | 10/1999 | Magill et al. | 408/227 |
| 6,132,149 | A | | 10/2000 | Howarth et al. | |
| 2003/0039522 | A1 | * | 2/2003 | Yanagida et al. | 408/230 |
| 2006/0056929 | A1 | | 3/2006 | Haenle | |

FOREIGN PATENT DOCUMENTS

| GB | 2184046 A | * | 6/1987 |
| JP | U-02-063912 | | 5/1990 |
| JP | U-03-096114 | | 10/1991 |
| JP | A-05-301108 | | 11/1993 |
| JP | A-7-308815 | | 11/1995 |

(Continued)

OTHER PUBLICATIONS

Chinese Office Action mailed on Jan. 8, 2010 in corresponding Chinese Patent Application No. 2006800550556 (with translation).

(Continued)

*Primary Examiner* — Daniel Howell
*Assistant Examiner* — Michael Vitale
(74) *Attorney, Agent, or Firm* — Oliff & Berridge, PLC

(57) ABSTRACT

A drill in which a flute is formed from a point to a base end side of a body of the drill, on a side face to be rotated about an axis, a cutting edge is formed between a wall surface of the flute which faces a drill rotational direction side and a flank at the point of the body, and a thinned portion is provided to a web portion of the point. The cutting edge is formed in a convex arc shape with a curvature radius 0.25 to 1 times a drill diameter; a radial rake angle at an outer peripheral portion of the cutting edge is −60 to −15 degrees; a corner portion, closer to the center of the point, of the thinned portion is formed in an arc shape with a curvature radius of at least 0.1 mm and not greater than 0.05 times the drill diameter; and the drill includes three flutes and three cutting edges.

9 Claims, 18 Drawing Sheets

FOREIGN PATENT DOCUMENTS

| | | |
|---|---|---|
| JP | A-10-156613 | 6/1998 |
| JP | A-2000-507163 | 6/2000 |
| JP | 2002103123 A * | 4/2002 |
| JP | A-2002-301613 | 10/2002 |
| JP | A-2003-205412 | 7/2003 |
| JP | A-2003-285211 | 10/2003 |

OTHER PUBLICATIONS

Decision on Rejection for Corresponding Chinese Patent Application No. 200680055055.6, mailed on Jul. 14, 2010 (w/ English translation).

Notice of Preliminary Rejection for corresponding Korean Patent Application No. 10-2009-7001385, mailed on Feb. 1, 2011 (w/ English translation).

Office Action issued in Japanese Patent Application No. 2008-522218 dated Nov. 1, 2011 (with translation).

Office Action issued in Chinese Patent Application No. 200680055055.6 dated Oct. 19, 2011 (with translation).

Office Action issued in Korean Patent Application No. 10-2009-7001385 dated Oct. 26, 2011 (with translation).

* cited by examiner

FIG. 11

|  | RADIAL RAKE ANGLE OF CUTTING EDGE | DURABILITY NUMBER (HOLES) | DURABILITY LIMIT |
|---|---|---|---|
| FIRST TEST EXAMPLE | −50° CUTTING EDGE R1 (0.3D) | 3,985 | NORMAL WEAR |
| SECOND TEST EXAMPLE | −30° CUTTING EDGE R1 (0.7D) | 3,450 | NORMAL WEAR |
| THIRD TEST EXAMPLE | −20° CUTTING EDGE R1 (0.9D) | 2,985 | NORMAL WEAR |
| FOURTH TEST EXAMPLE | −13° CUTTING EDGE R1 (1.5D) | 1,511 | EDGE FRACTURE |
| FIRST COMPARISON EXAMPLE | 3° CONCAVE EDGE | 852 | EDGE FRACTURE |

FIG. 17

| | R3 SIZE (mm) | DURABILITY NUMBER (HOLES) | DURABILITY LIMIT |
|---|---|---|---|
| FIFTH TEST EXAMPLE | 0.750 (7.5% × D) | 253 | EDGE FRACTURE |
| SIXTH TEST EXAMPLE | 0.400 (4% × D) | 3,700 | NORMAL WEAR |
| SEVENTH TEST EXAMPLE | 0.150 (1.5% × D) | 4,100 | NORMAL WEAR |
| SECOND COMPARISON EXAMPLE | 0.004 | 667 | EDGE FRACTURE |

# DRILL

TECHNICAL FIELD

The present invention relates to a drill, and more specifically, to a high feed drill of which a feed per revolution is higher than normal.

BACKGROUND

Conventionally, in a case where high feed machining, in which a feed per revolution exceeds 5% of a drill diameter, is performed with a drill with a linear cutting edge, fracture or the like of the cutting edge is likely to occur due to insufficient strength of a corner portion of the cutting edge, so the machining may be prevented in some cases. Furthermore, even in a case where the drill is used under normal conditions in which the feed per revolution is 2 to 3% of the drill diameter, the corner portion of the drill cutting edge may often be fractured or completely worn out to reach durability limit.

Therefore, Patent Document 1 proposes a drill which has a cutting edge with fracture resistance and which enables favorable chip curling as well as deep hole drilling and through hole drilling in a stable manner. In the drill, a portion, which is closer to a center cutting edge portion, of a main cutting edge portion is formed in a straight line or a convex arc with a large curvature radius. Furthermore, the outer peripheral side is formed as a convex-shape curved edge having a curvature radius that is gradually reduced towards the outer periphery. The lower limit of the curvature radius is 0.25 times the drill diameter. Moreover, the main cutting edge portion has no inflection point and a radial rake angle q at the outer peripheral portion is less than or equal to −15 degrees and greater than or equal to −40 degrees. The drill having a cutting portion formed as above disperses load across the main cutting edge, thereby preventing concentration of the load at one point. As a consequence, edge fracture is unlikely to occur, thus the tool life can be lengthened.
Patent document 1: Japanese Patent Application Publication No. 2003-285211

DISCLOSURE OF THE INVENTION

Problems to be Solved by the Invention

Nevertheless, in a case where high feed machining, in which a feed per revolution is higher than normal, is performed with the drill described in the aforementioned Patent Document 1, damage may be caused on the cutting edge, and there has been a problem that thick chips generated during high feed machining can not be broken down. Furthermore, there have been other problems such as chip welding and accumulation on a chisel edge.

The present invention has been devised in order to solve the aforementioned problems, and it is an object of the invention to provide a drill with lengthened life by preventing wear and fracture of a cutting edge even in a case where high feed machining is performed.

SUMMARY

To achieve the aforementioned object, a drill in accordance with the present invention, in which a flute for removing a chip is formed from a point to a base end side of a body of the drill, on a side face of the body of the drill to be rotated about an axis, a cutting edge is formed at a ridge portion between a wall surface of the flute which faces a drill rotational direction side and a flank at the point of the body of the drill, and a thinned portion is provided to a web portion of the point of the body of the drill, is characterized in that the cutting edge is formed in a convex arc shape with a curvature radius being greater than or equal to 0.25 and less than or equal to 1 times a drill diameter, a radial rake angle at an outer peripheral portion of the cutting edge is greater than or equal to −60 degrees and less than or equal to −15 degrees, and a corner portion, which is closer to the center of the point of the drill, of the thinned portion is formed in an arc shape with a curvature radius of at least 0.1 mm and not greater than 0.05 times the drill diameter.

Furthermore, the drill may include three flutes and three cutting edges.

In addition, a chisel edge may be formed in the point portion of the drill.

Moreover, the drill may be made of ultrahard material.

Furthermore, in the drill, a center cutting edge having a linear shape may be formed at a portion between the cutting edge and the corner portion of the thinned portion that is on the drill rotational direction side with respect to the cutting edge.

In addition, in the drill, a center cutting edge having an arc shape with a curvature radius larger than the curvature radius of the cutting edge may be formed at a portion between the cutting edge and the corner portion of the thinned portion that is on the drill rotational direction side with respect to the cutting edge.

Moreover, in the drill, a portion between the cutting edge and the corner portion of the thinned portion that is on the drill rotational direction side with respect to the cutting edge may be formed such that the cutting edge connects to a first center cutting edge having a linear shape, the first center cutting edge connects to a second center cutting edge having an arc shape, and the second center cutting edge connects to the corner portion of the thinned portion.

BRIEF DESCRIPTION OF THE DRAWINGS

FIG. 11 is a table showing the test results of a first durability test.

FIG. 17 is a table showing the test results of a second durability test.

DETAILED DESCRIPTION OF EMBODIMENTS

Figure 1:
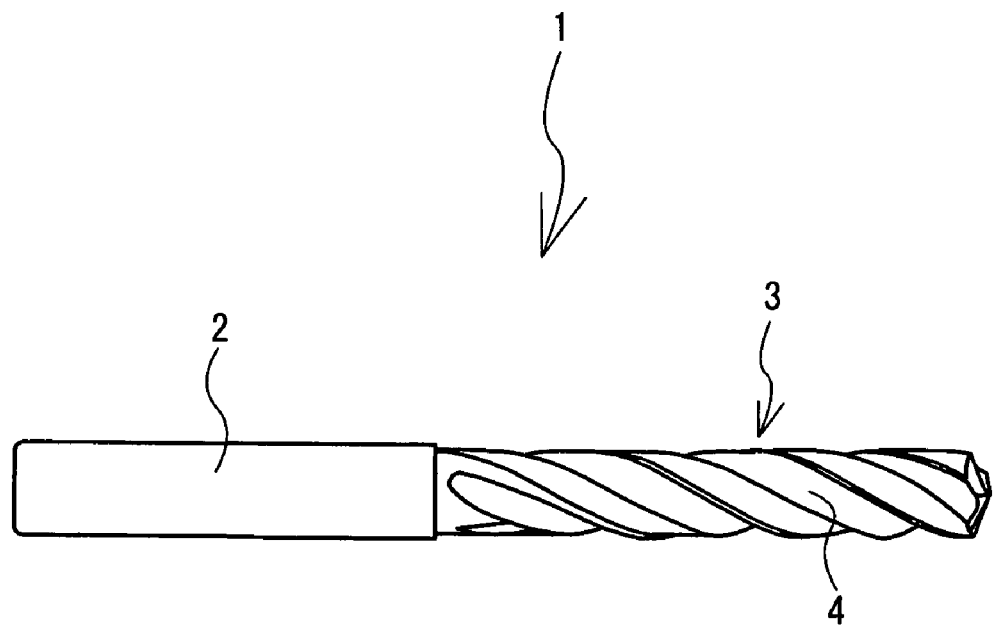
FIG. 1 is a side view of a drill 1.

A drill of the invention has a cutting edge formed in a convex arc shape having a curvature radius that is greater than or equal to 0.25 times and less than or equal to 1 times the drill diameter. In addition, a radial rake angle at the outer peripheral portion of the cutting edge is greater than or equal to −60 degrees and less than or equal to 15 degrees, and a corner portion, which is closer to the center of a point portion of the drill, of a thinned portion is formed in an arc shape having a curvature radius of at least 0.1 mm and not greater than 0.05 times the drill diameter. Consequently, even in a case where high feed machining, in which a feed per revolution of the drill is higher than normal, is performed, wear and fracture of the outer peripheral corner of the cutting edge can be prevented. Moreover, chip removal can be facilitated and thus chip welding and accumulation on the point portion of the drill can also be prevented, so damage of the cutting edge can be prevented, thereby the life of the drill can be lengthened.

Furthermore, in a case where the present invention is applied to a three-edged drill that has three flutes and three cutting edges, in addition to the aforementioned effects, drill runout during drilling can be prevented, thus drilling precision can be improved.

Moreover, in a case where the present invention is applied to a drill provided with a chisel edge, a point portion of the drill is not moved when drilling stars, compared with a case of a drill that has no chisel edge, so the drilling precision can be improved. Furthermore, chip welding and accumulation on the chisel edge can be prevented.

In addition, in a case where the drill of the present invention is formed of ultrahard material, wear of the drill can be prevented more effectively and thus the life of the drill can be further lengthened.

Moreover, when a linear-shape center cutting edge is formed at a portion between the cutting edge of the drill of the present invention and the corner portion of the thinned portion that is on a drill rotational direction side with respect to the cutting edge, a space for a chip room for collecting chips can be secured, thereby smooth chip removal can be allowed. Consequently, chip welding and accumulation on the chisel edge can also be prevented.

In addition, in a case where a center cutting edge in an arc shape having a larger curvature radius than the curvature radius of the cutting edge is formed at a portion between the cutting edge of the drill of the present invention and the corner portion of the thinned portion that is on the drill rotational direction side with respect to the cutting edge, a space for a chip room for collecting chips can be secured, thereby smooth chip removal can be allowed. Consequently, chip welding and accumulation on the chisel edge can also be prevented.

Furthermore, in a case where a portion between the cutting edge of the drill of the present invention and the corner portion of the thinned portion that is on the drill rotational direction side with respect to the cutting edge is formed such that the cutting edge connects to a first center cutting edge having a linear shape, and the first center cutting edge connects to a second center cutting edge having an arch shape, and the second center cutting edge connects to the corner portion of the thinned portion, a space for a chip room for collecting chips can be secured, thereby smooth chip removal can be allowed. Consequently, chip welding and accumulation on the chisel edge can be prevented.

Figure 2:
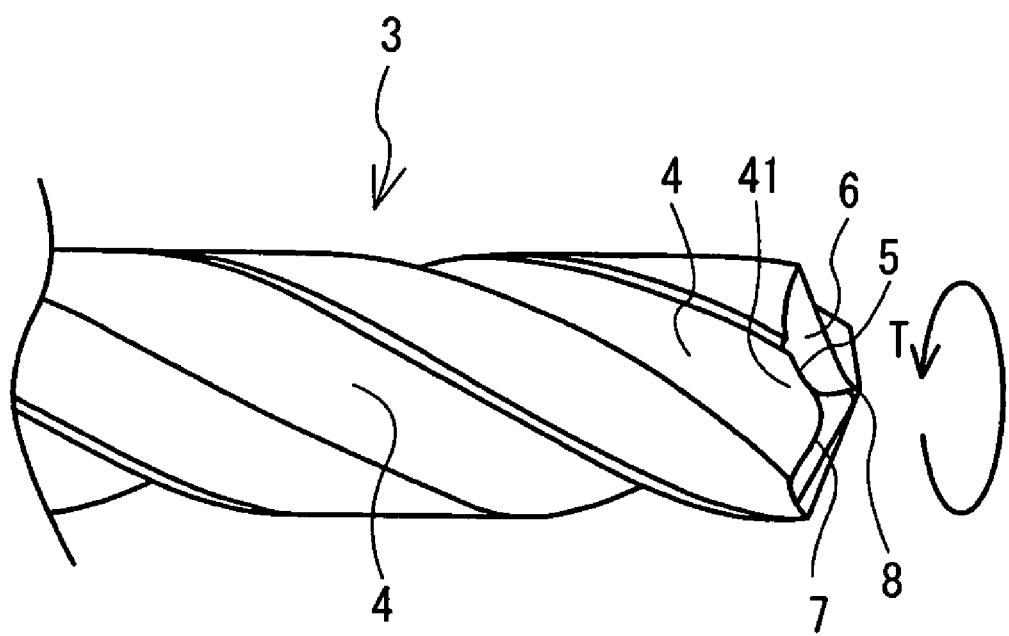
FIG. 2 is an enlarged view of a point portion of a body 3 of the drill 1.
Figure 3:
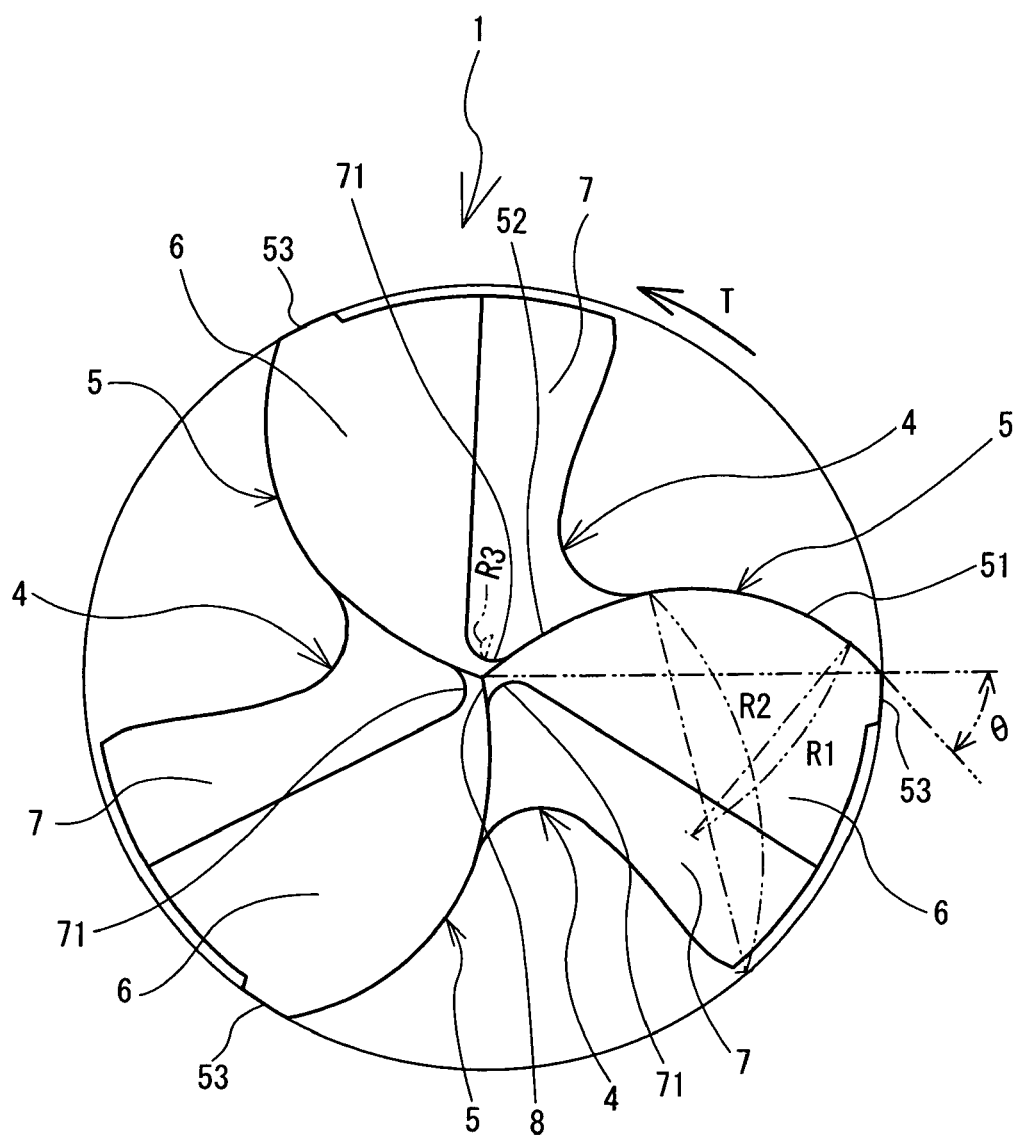
FIG. 3 is a front view of the point portion of the drill 1.

Hereafter, a drill 1 according to a first embodiment of the present invention will be described with reference to FIGS. 1 to 3. FIG. 1 is a side view of the drill 1, FIG. 2 is an enlarged view of a point portion of a body 3 of the drill 1, and FIG. 3 is a front view of a point portion of the drill 1. As shown in FIG. 1, the drill 1 according to the present embodiment is formed in a substantially cylindrical shape, is made of hard material such as ultrahard material and high-speed tool steel, and includes a shank 2 and a body 3 which extends from the shank 2. Furthermore, the body 3 is provided with three helical flutes 4 for removing chips and the point portion of the body 3 is provided with three cutting edges 5. Accordingly, the drill 1 is a three-edged drill as well as a twist drill for high feed machining, which is used for high feed machining in which the feed per revolution is higher than normal.

Next, the structure of the point portion of the drill 1 will be described with reference to FIGS. 2 and 3. As shown in FIGS. 2 and 3, a cutting edge 5 is formed at a ridge portion between an inner wall surface 41 facing a rotational direction T of each of the flutes 4 of the drill 1 and each of flanks 6 of the point portion of the drill 1, and a thinned portion 7 for decreasing web thickness is formed at the opposite side of each of the flanks 6 in the rotational direction T of the drill 1. A corner portion 71 formed at the drill-center side of the thinned portion 7 is formed in an arc shape having a predetermined curvature radius R3.

Next, the configuration of the cutting edge 5 is described referring to FIG. 3. As shown in FIG. 3, the cutting edge 5 includes a main cutting edge portion 51 which is formed in a convex arc shape having a curvature radius R1 and protrudes toward the rotational direction T side of the drill 1 and a center cutting edge 52 which continues from the main cutting edge portion 51 and connects to, in a convex arc shape having a curvature radius R2, a corner portion 71 formed at the drill-center side of the thinned portion 7 which faces the main cutting edge portion 51 in the rotational direction T of the drill 1. Furthermore, an outer peripheral corner of the main cutting edge portion 51 is provided with a margin 53 of a predetermined width.

The curvature radius R1 of the main cutting edge portion 51 may preferably be, for instance, greater than or equal to 0.25 and less than or equal to 1 times the drill diameter (D) (i.e. greater than or equal to 0.25D and less than or equal to 1D), and a radial rake angle q of the drill 1, in the outer periphery portion (the outer periphery corner) of the main cutting edge portion 51, may preferably be greater than or equal to −60 degrees and less than or equal to −15 degrees. The above numerical limitations are based on the test results of a first durability test which will be described later. Moreover, the curvature radius R2 of the center cutting edge 52 may preferably be larger than the curvature radius R1 of the main cutting edge portion 51 to facilitate chip removal.

Furthermore, a chisel edge 8 is formed at a center portion of the point portion of the drill 1. However, since the corner portion 71 formed at the drill-center side of the thinned portion 7 is formed in the arc shape having the curvature radius R3, a space for a chip room for collecting chips can be secured, thus smooth chip removal can be allowed. Accordingly, chip welding and accumulation or the like on the chisel edge 8 can be prevented. In this case, the curvature radius R3 of the corner portion 71 formed at the drill-center side of the thinned portion 7 may preferably be formed in an arc shape with a curvature radius of at least 0.1 mm and not greater than 0.05 times (0.05D) the drill diameter (D). The above numerical limitations are based on the test results of a second durability test which will be described later.

Figure 4:
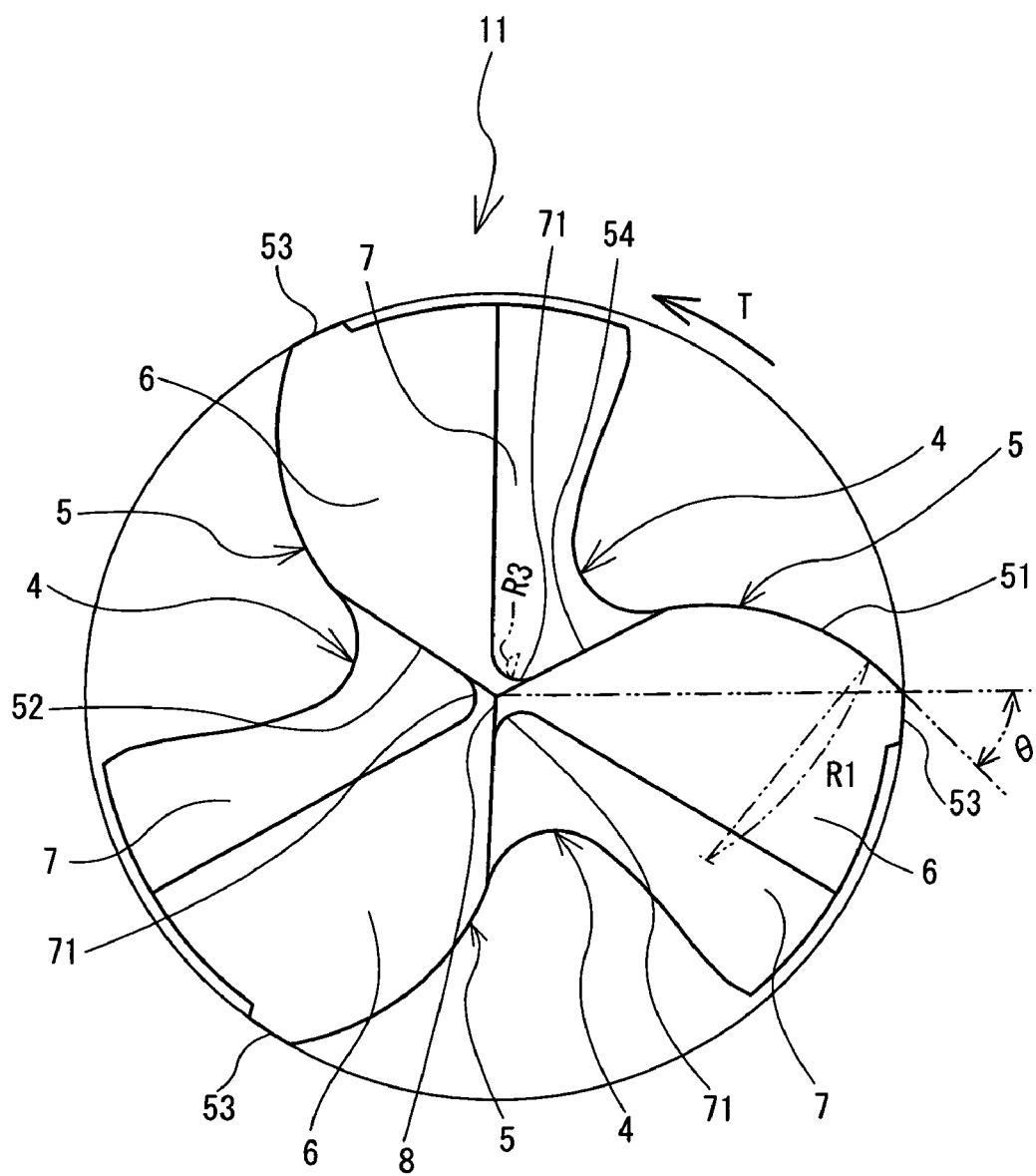
FIG. 4 is a front view of a point portion of a drill 11 according to a second embodiment.

Next, a drill 11 according to a second embodiment will be described with reference to FIG. 4. FIG. 4 is a front view of a point portion of the drill 11 according to the second embodiment. The structure of the drill 11 according to the second embodiment shown in FIG. 4 is the same as the drill 1 according to the first embodiment except that a center cutting edge 54 is formed in a linear shape. Since the drill 11 according to the second embodiment has the center cutting edge 54 formed in the linear shape, a space for a chip room for collecting chips can be secured, and thereby smooth chip removal can be allowed. Accordingly, chip welding and accumulation or the like on the chisel edge 8 can be prevented.

Figure 5:
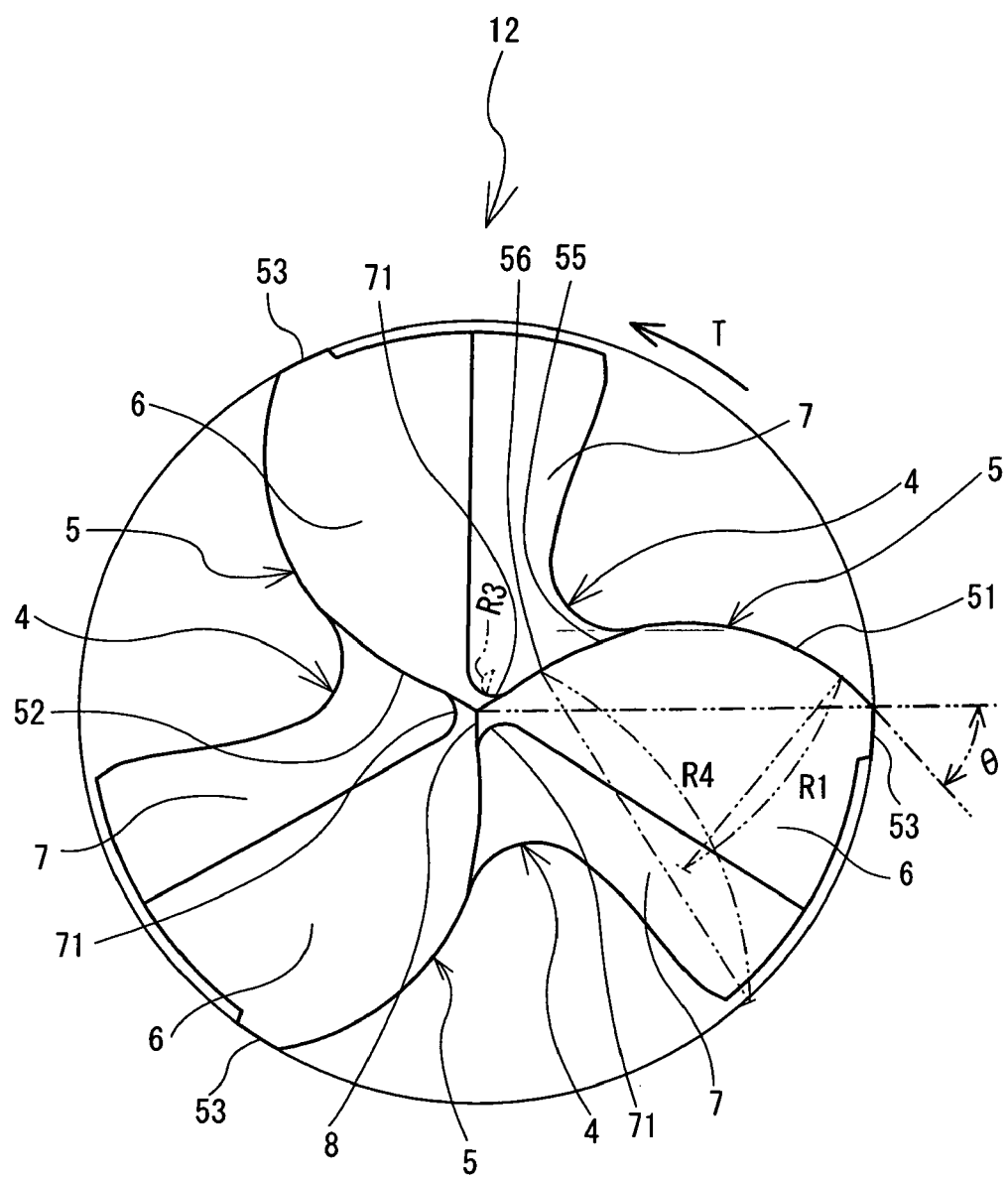
FIG. 5 is a front view of a point portion of a drill 12 according to a third embodiment.

Next, a point portion of a drill 12 according to a third embodiment will be described with reference to FIG. 5. FIG. 5 is a front view of the point portion of the drill 12 according to the third embodiment. The drill 12 according to the third embodiment shown in FIG. 5 differs from the drill 1 according to the first embodiment in that a first center cutting edge 55 which continues from the main cutting edge portion 51 is formed in a linear shape, and that a second center cutting edge 56 connecting the first center cutting edge 55 and the corner portion 71 of the thinned portion is formed in an arc shape having a curvature radius R4. The curvature radius R4 of the second center cutting edge 56 may preferably be larger than the curvature radius R1 of the main cutting edge portion 51 to facilitate chip removal. Since the drill 12 according to the third embodiment has the first center cutting edge 55 formed in the linear shape and has the second center cutting edge 56, which connects the first center cutting edge 55 and the thinning corner portion 71, formed in an arc shape having the curvature radius R4, a space for a chip room for collecting chips can be secured, and thereby smooth chip removal can be allowed. Accordingly, chip welding and accumulation or the like on the chisel edge 8 can be prevented.

Figure 6:
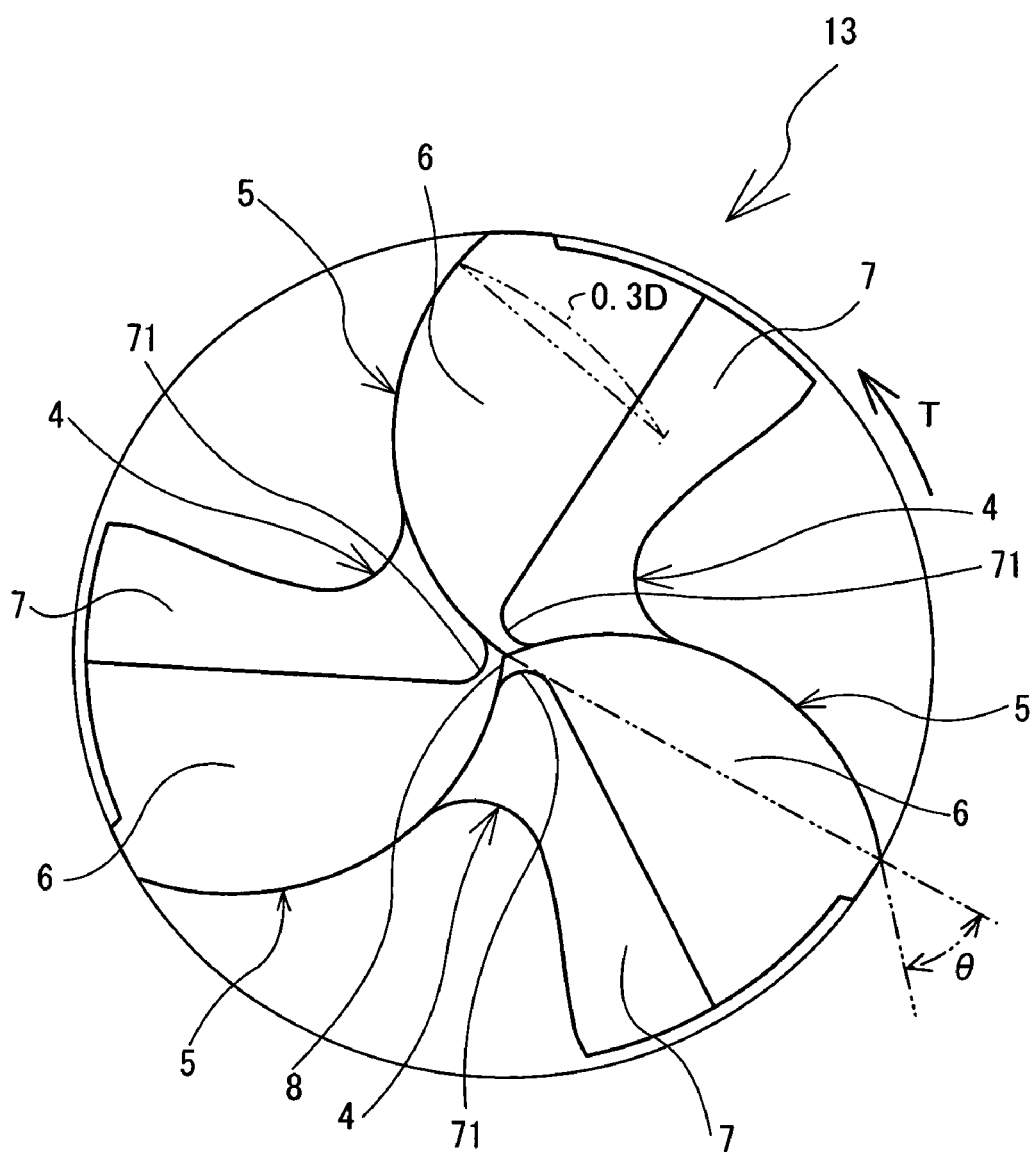
FIG. 6 is a front view of a point portion of a drill 13 of a first test example.
Figure 9:
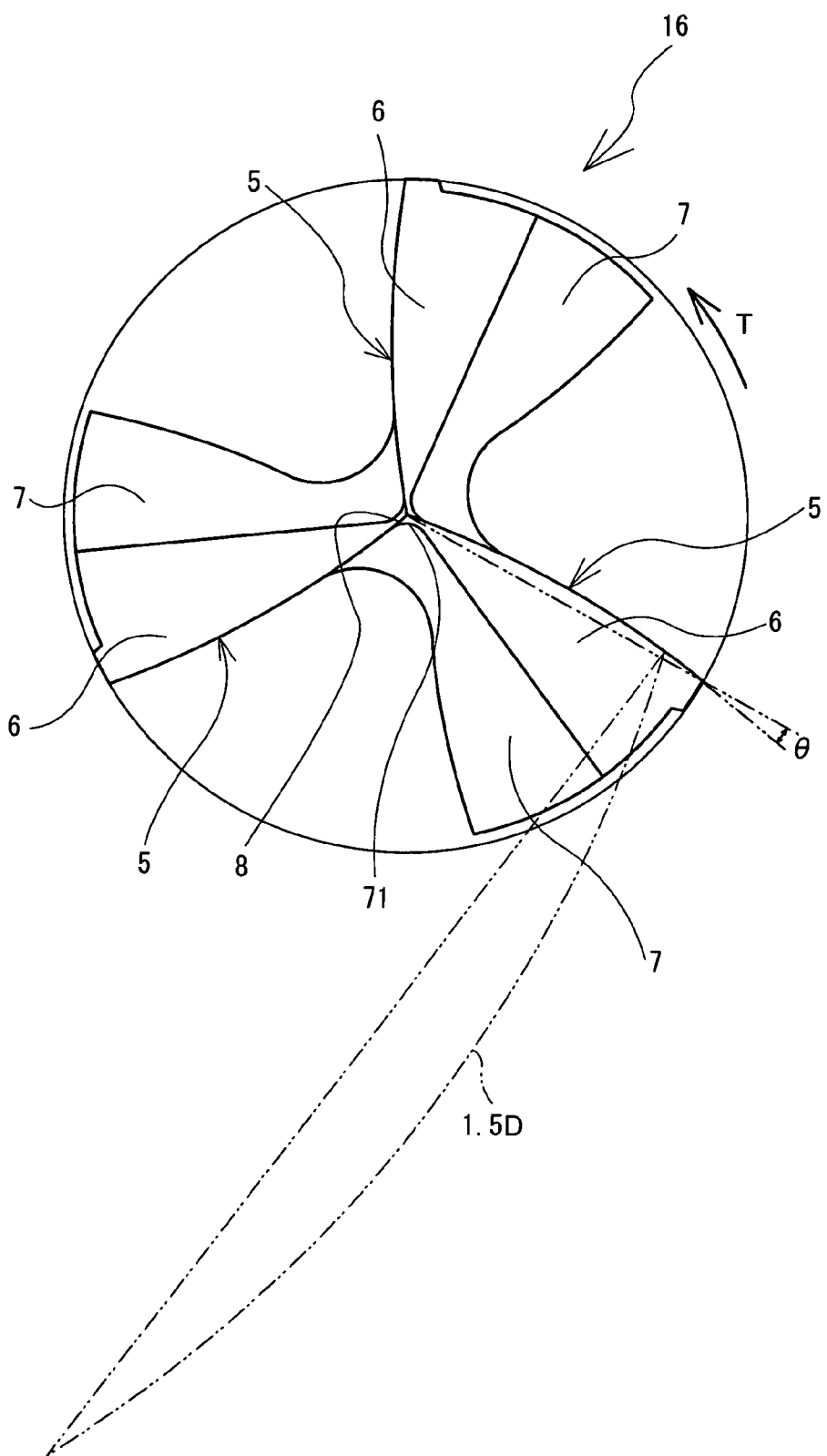
FIG. 9 is a front view of a point portion of a drill 16 of a fourth test example.
Figure 10:
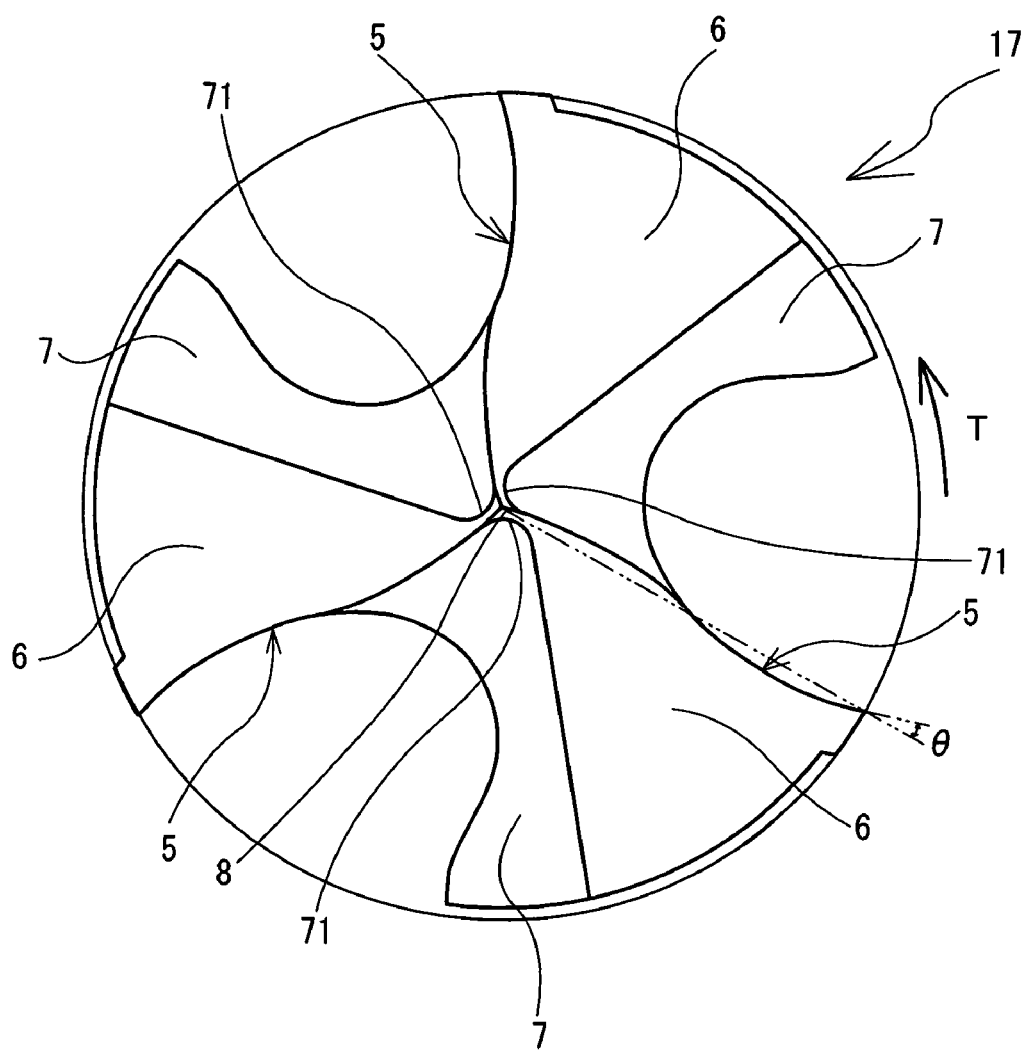
FIG. 10 is a front view of a point portion of a drill 17 of a first comparison example.
Figure 12:
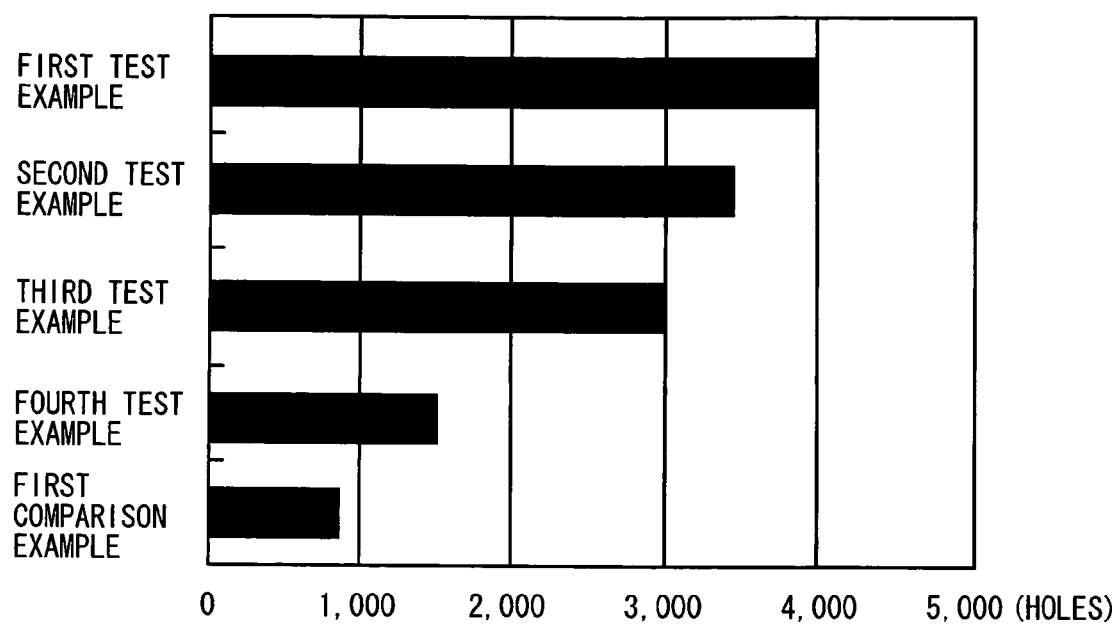
FIG. 12 is a graph showing the test results of the first durability test.

Next, referring to FIGS. 6 to 12, a description will be given of the results of a first durability test with first to fourth test examples and a first comparison example of the drill 1 according to the first embodiment configured as described above. FIG. 6 is a front view of a point portion of a drill 13 in the first test example, FIG. 7 is a front view of a point portion of a drill 14 in the second test example, FIG. 8 is a front view of a point portion of a drill 15 of the third test example, FIG. 9 is a front view of a point portion of a drill 16 of the fourth test example, FIG. 10 is a front view of a point portion of a drill 17 in the first comparison example, FIG. 11 is a table showing the test results of the first durability test, and FIG. 12 is a graph showing the test results of the first durability test.

The first durability test was conducted with the curvature radius of the cutting edge 5 varied. Since the curvature radius of the cutting edge 5 was varied, the radial rake angle θ at the outer peripheral portion of the cutting edge 5 was also varied. As shown in FIG. 6, the drill 13 in the first test example was a three-edged drill with a drill diameter of 10 mm, which had the same structure as the drill 1 according to the first embodiment, the cutting edge 5 was formed in a convex arc shape with a curvature radius of 0.3 times (0.3D) the drill diameter (D), and the radial rake angle θ at the outer peripheral portion of the cutting edge 5 was −50 degrees.

Figure 7:
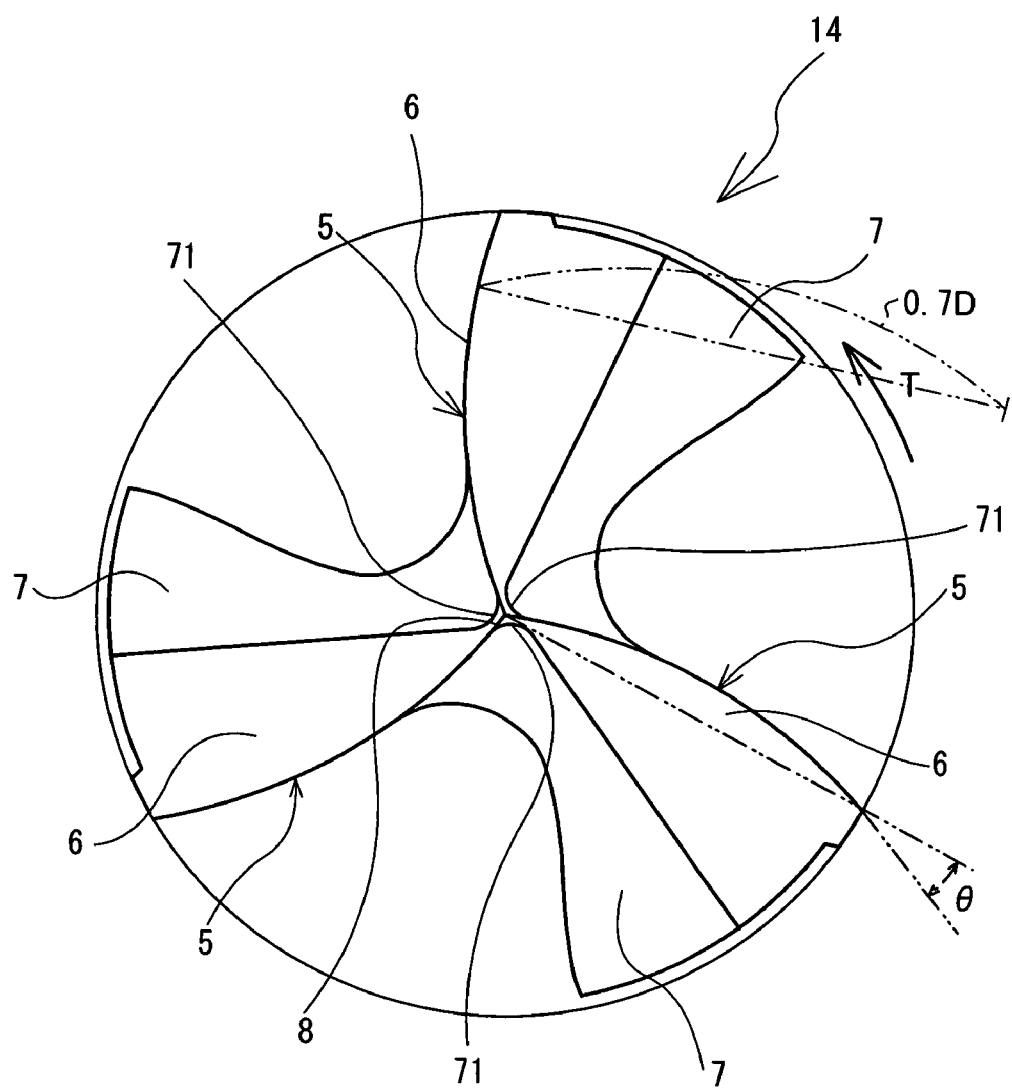
FIG. 7 is a front view of a point portion of a drill 14 of a second test example.

Furthermore, as shown in FIG. 7, the drill 14 of the second test example was a three-edged drill with a drill diameter of 10 mm, which had the same structure as the drill 1 according to the first embodiment, the cutting edge 5 was formed in a convex arc shape with a curvature radius of 0.7 times (0.7D) the drill diameter (D), and the radial rake angle θ at the outer peripheral portion of the cutting edge 5 was −30 degrees.

Figure 8:
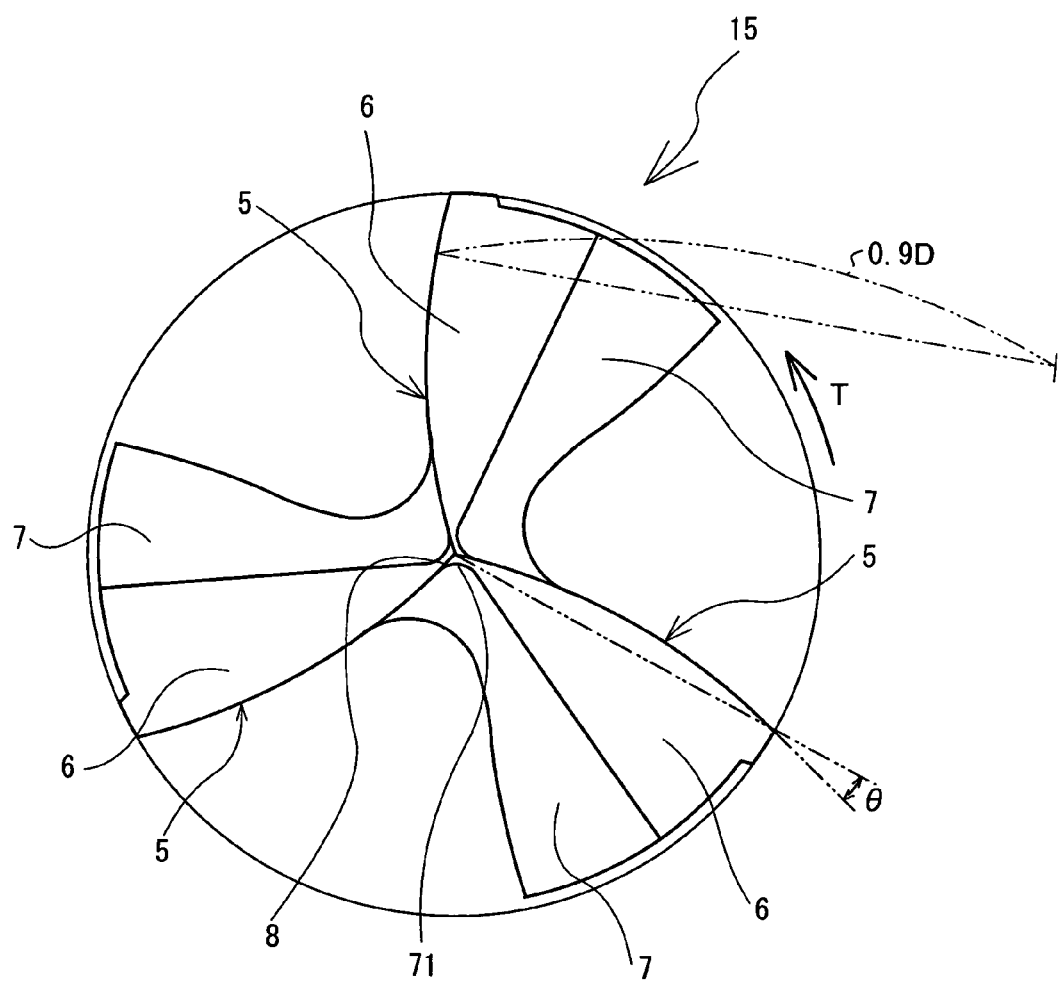
FIG. 8 is a front view of a point portion of a drill 15 of a third test example.

Moreover, as shown in FIG. 8, the drill 15 in the third test example was a three-edged drill with a drill diameter of 10 mm, which had the same structure as the drill 1 according to the first embodiment, the cutting edge 5 was formed in a convex arc shape with a curvature radius of 0.9 times (0.9D) the drill diameter (D), and the radial rake angle θ at the outer peripheral portion of the cutting edge 5 was −20 degrees.

Furthermore, as shown in FIG. 9, the drill 16 of the fourth test example was a three-edged drill with a drill diameter of 10 mm, which had the same structure as the drill 1 according to the first embodiment, the cutting edge 5 was formed in a convex arc shape with a curvature radius of 1.5 times (1.5D) the drill diameter (D), and the radial rake angle θ at the outer peripheral portion of the cutting edge 5 was −13 degrees.

Moreover, as shown in FIG. 10, the drill 17 of the first comparison example was a three-edged drill with a drill diameter of 10 mm, which had the same structure as in the first embodiment, the cutting edge 5 was a concave edge, and the radial rake angle θ at the outer peripheral portion of the cutting edge 5 was +3 degrees.

Next, a description will be given of the test results of the first durability test which was conducted with the first to fourth test examples and the first comparison example. The first durability test with the drills of the first to fourth test examples and the first comparison example was conducted under the following conditions:

Drill diameter: 10 mm
Root diameter of the flute: 3.5 mm (35% of the drill diameter)
Work material: FCD600 (cast metal)
Used machine: Vertical machining center
Oil feeding system: Center-through (An oil hole (not shown) was provided through each of the flanks 6.)
Cutting fluid: Water soluble cutting fluid
Drilling depth: 50 mm (five times the drill diameter)
Cutting speed: 100 m/min
Feed per revolution: 1 mm/rev (10% of the drill diameter)

Next, the test results of the first durability test will be explained with reference to the table illustrating the test results shown in FIG. 11 and the graph shown in FIG. 12. In the first durability test, when a VB wear width of the outer peripheral corner of the cutting edge 5 reached 0.2 mm, it was considered that the wear was at the durability limit, and so if the wear width was less than or equal to 0.2 mm, the wear was considered as normal wear. In the first durability test, the number of holes formed within the durability limit and the number of holes formed before edge fracture occurred were compared. As shown in FIGS. 11 and 12, the durability number for the drill 13 in the first test example was 3985 holes, the durability number for the drill 14 in the second test example was 3450 holes, the durability number for the drill 15 in the third test example is 2985 holes, and 1511 holes were drilled with the drill 16 in the fourth test example before fracture occurred on the cutting edge 5 and the durability limit was reached. In comparison to this, 852 holes were drilled with the drill 17 in the first comparison example before edge fracture occurred on the cutting edge 5 and the durability limit was reached.

As shown by the test results of the first durability test, the cutting edge 5 of the drill 17 in the first comparison example was a concave edge, the radial rake angle θ at the outer peripheral portion of the cutting edge 5 was +3 degrees, fracture was likely to occur on the cutting edge 5, the durability number was only 852 holes, and the durability was poor. In comparison to this, in the case where the cutting edge 5 was formed in a convex arc shape having a curvature radius of 1.5 times (1.5D) the drill diameter (D), and the radial rake angle θ at the outer peripheral portion of the cutting edge 5 was set to −13 degrees, as in the drill 16 in the fourth test example, the durability number was 1511 and the durability was improved compared with the first comparison example. In addition, in the case where the cutting edge 5 was formed in a convex arc shape having a curvature radius of 0.9 times (0.9D) the drill diameter (D) and the radial rake angle θ at the outer peripheral portion of the cutting edge 5 was set to −20 degrees, as in the drill 15 in the third test example, the durability number was 2985 without causing any edge fracture, thus the durability was significantly improved compared with the first comparison example. Moreover, in the case where the cutting edge 5 was formed in a convex arc shape having a curvature radius of 0.7 times (0.7D) the drill diameter (D) and the radial rake angle θ at the outer peripheral portion of the cutting edge 5 was set to −30 degrees, as in the drill 14 in the second test example, the durability number was 3450 without causing any edge fracture, thus the durability was significantly improved compared with the first comparison example. Furthermore, in the case where the cutting edge 5 was formed in a convex arc shape having a curvature radius of 0.3 times (0.3D) the drill diameter (D) and the radial rake angle θ at the outer peripheral portion of the cutting edge 5 was set to −50 degrees, as in the drill 13 of the first test example, the durability number was 3985 without causing any edge fracture, thus the durability was significantly improved compared with the first comparison example.

Consequently, in a case where the high feed machining in which the drill feed per revolution is set to 10% of the drill diameter is performed, it is considered that, in order to improve durability without causing edge fracture, the cutting edge 5 may be formed in a convex arc shape and a sufficient curvature radius of the convex arc may be less than or equal to 1.5 times the drill diameter, however, the curvature radius may preferably be less than or equal to 1.0 times the drill diameter. Furthermore, since a good durability is exhibited even in a case where the curvature radius of the cutting edge is 0.3 times the drill diameter, it can be judged that the curvature radius of the cutting edge may be at least 0.25 times the drill diameter.

Furthermore, in the case where the radial rake angle q at the outer peripheral portion of the cutting edge 5 is −13 degrees as with the drill 16 in the fourth test example, the durability number is 1511 holes, so it can be judged that the sufficient rake angle q may be less than or equal to −15 degrees. Moreover, in the case where the rake angle q is set to −50 degrees, the durability number is 3985 holes without causing edge fracture, thus the durability is significantly improved compared to the first comparison example. Accordingly, it can be judged that rake angles q of up to −60 degrees may be desirable.

Figure 13:
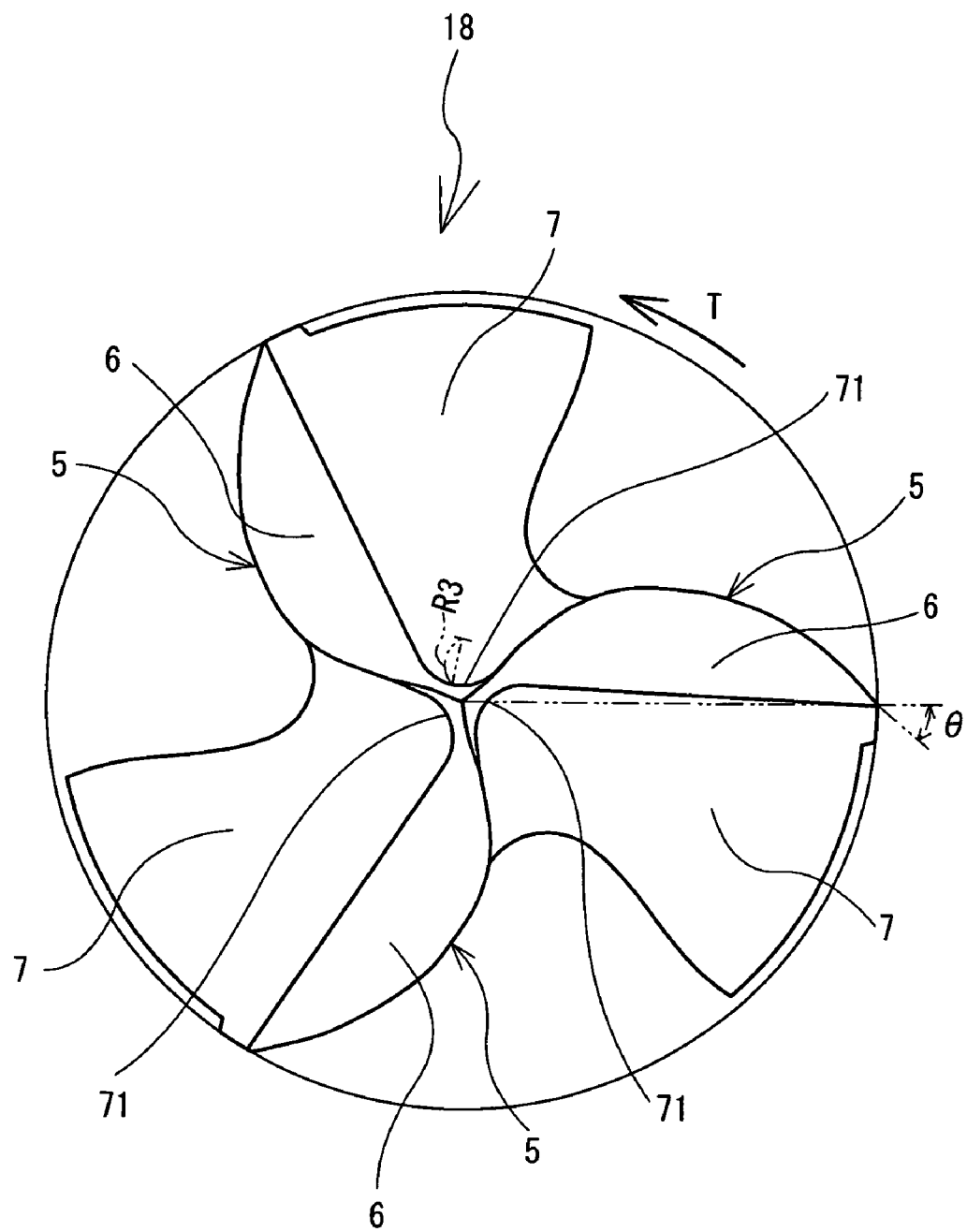
FIG. 13 is a front view of a point portion of a drill 18 of a fifth test example.
Figure 14:
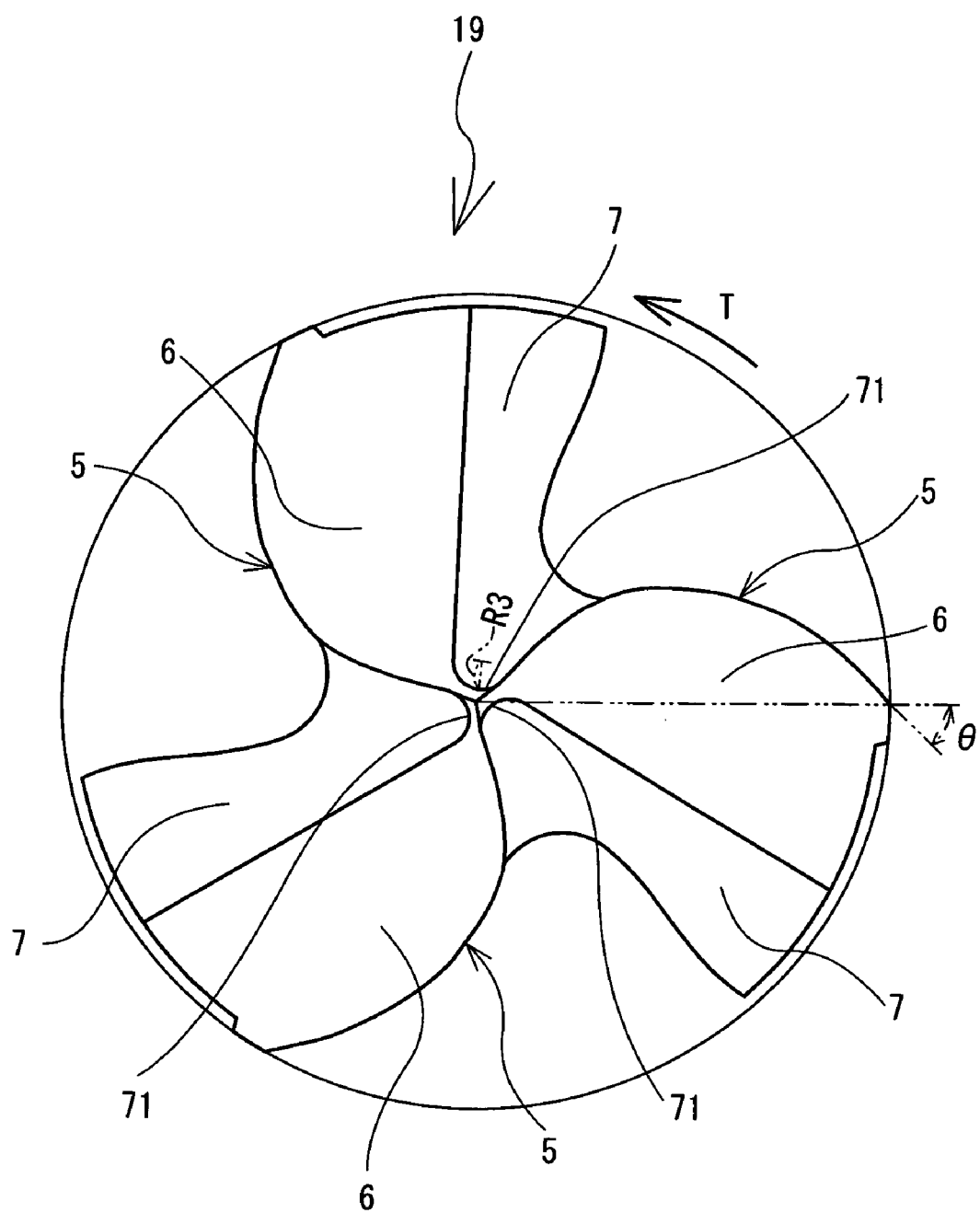
FIG. 14 is a front view of a point portion of a drill 19 of a sixth test example.
Figure 15:
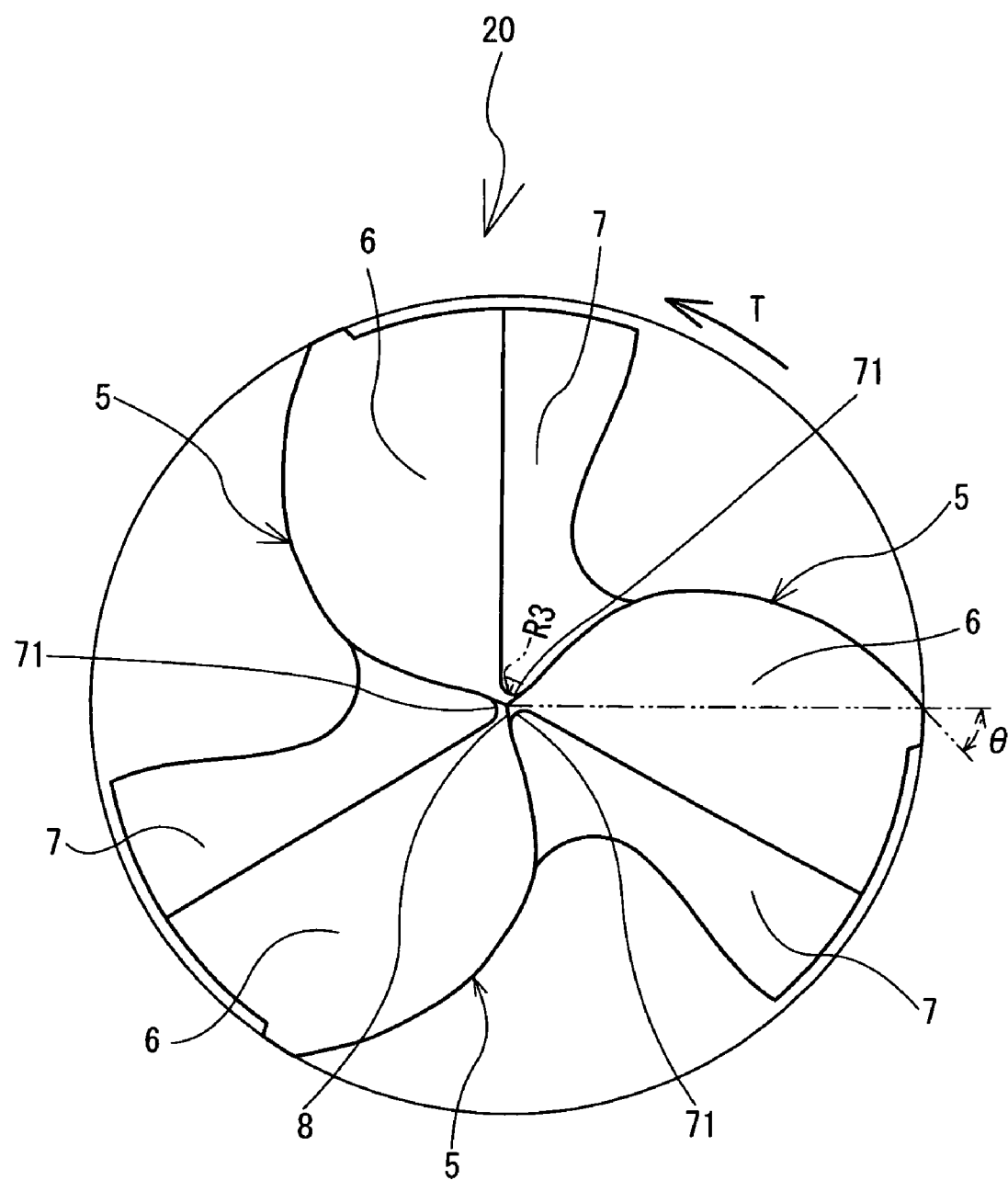
FIG. 15 is a front view of a point portion of a drill 20 of a seventh test example.
Figure 16:
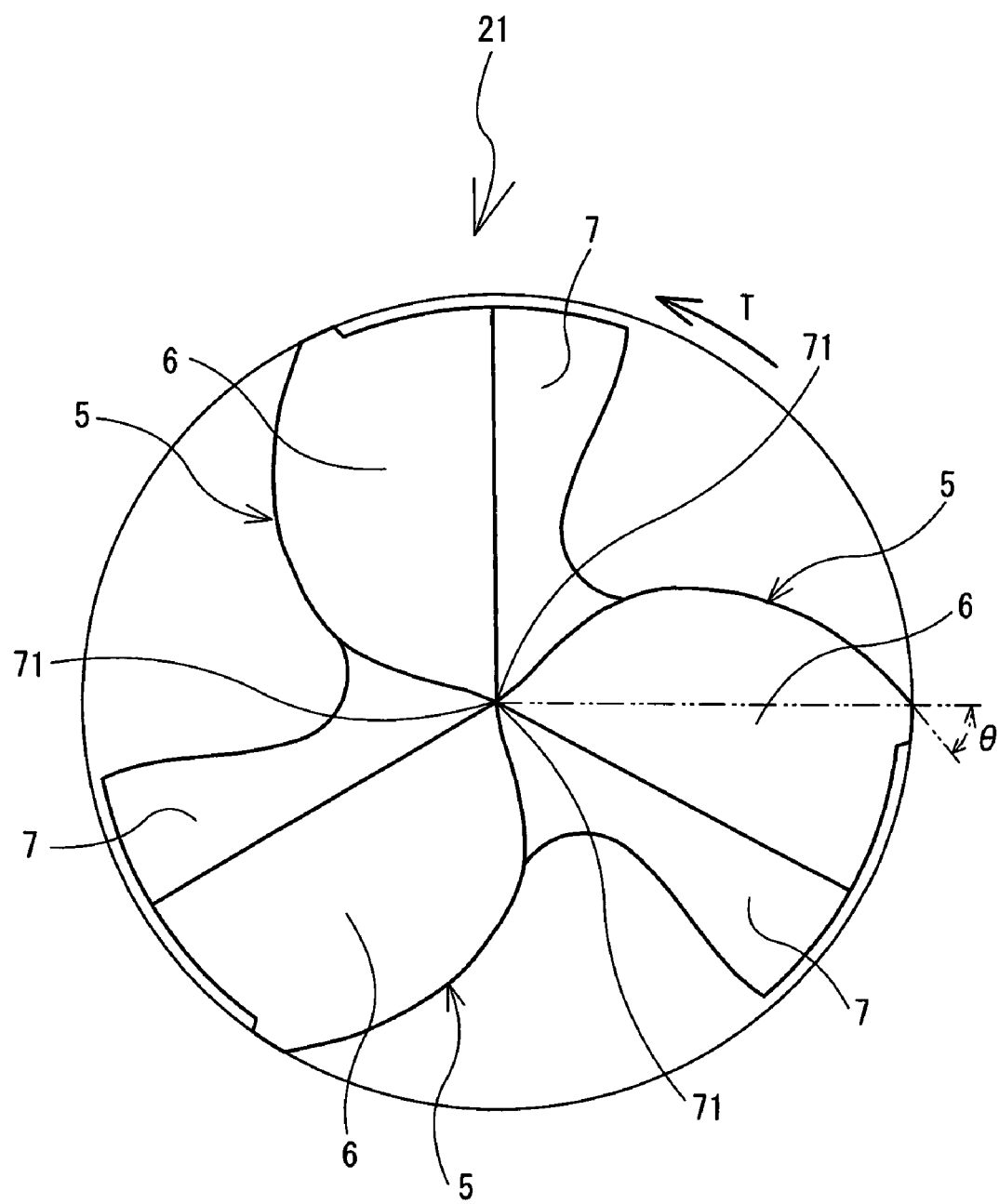
FIG. 16 is a front view of a point portion of a drill 21 of a second comparison example.
Figure 18:
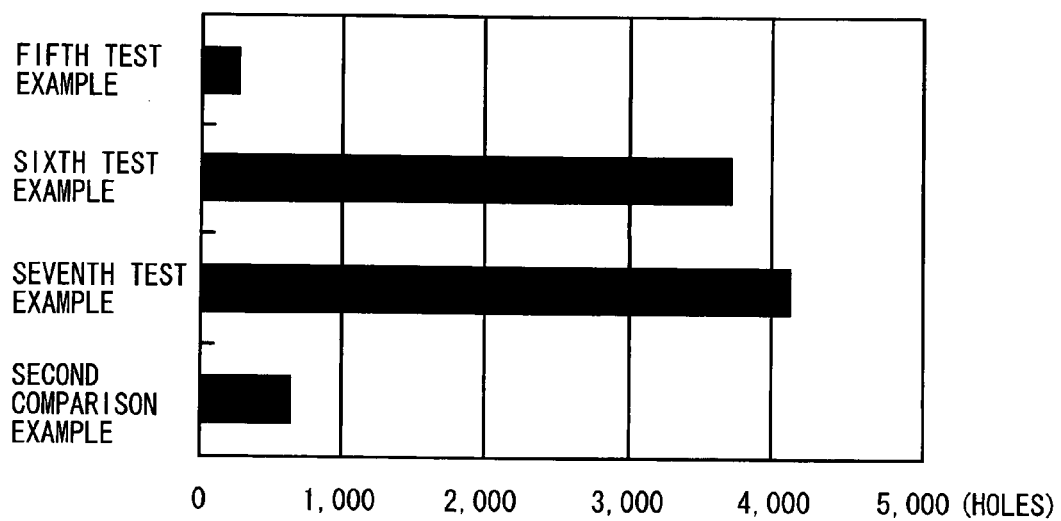
FIG. 18 is a graph showing the test results of the second durability test.

Next, referring to FIGS. 13 to 18, a description will be given of the test results of a second durability test with the fifth to seventh test examples and a second comparison example of the drill 1 according to the first embodiment. FIG. 13 is a front view of a point portion of a drill 18 of the fifth test example, FIG. 14 is a front view of a point portion of a drill 19 in the sixth test example, FIG. 15 is a front view of a point portion of a drill 20 of the seventh test example, FIG. 16 is a front view of a point portion of a drill 21 of the second comparison example, FIG. 17 is a table showing the test results of the second durability test, and FIG. 18 is a graph showing the test results of the second durability test.

The second durability test was conducted while varying the curvature radius R3 of the corner portion 71 formed at the drill-center side of the thinned portion 7. As shown in FIG. 13, the drill 18 of the fifth test example was a three-edged drill with a drill diameter of 10 mm, which had the same structure as the drill 1 according to the first embodiment, and the curvature radius R3 of the corner portion 71 formed at the drill-center side of the thinned portion 7 was 0.750 mm (7.5% of the drill diameter (D)). In addition, as shown in FIG. 14, the drill 19 of the sixth test example was a three-edged drill with a drill diameter of 10 mm, which had the same structure as the drill 1 according to the first embodiment, and the curvature radius R3 of the corner portion 71 formed at the drill-center side of the thinned portion 7 was 0.400 mm (4% of the drill diameter (D)). Moreover, as shown in FIG. 15, the drill 20 of the seventh test example was a three-edged drill with a drill diameter of 10 mm, which had the same structure as the drill 1 according to the first embodiment, and the curvature radius R3 of the corner portion 71 formed at the drill-center side of the thinned portion 7 was 0.150 mm (1.5% of the drill diameter (D)). Additionally, as shown in FIG. 16, the drill 21 of the second comparison example was a three-edged drill with a drill diameter of 10 mm, which had the same structure as the drill 1 according to the aforementioned first embodiment, and the curvature radius R3 of the corner portion 71 formed at the drill-center side of the thinned portion 7 was 0.004 mm (a substantially acute angle).

Next, a description will be given of the test results of the second durability test which was conducted with the fifth to seventh test examples and the second comparison example. The second durability test with the drills in the fifth to seventh test examples and the second comparison example was conducted under the following conditions:
Drill diameter: 10 mm
Root diameter of the flute: 3.5 mm (35% of the drill diameter)
Work material: FCD600 (cast metal)
Used Machine Vertical machining center
Oil feeding system: Center-through (An oil hole (not shown) was provided through each of the flanks 6.)
Cutting fluid: Water soluble cutting fluid
Drilling depth: 50 mm (five times the drill diameter)
Cutting speed: 100 m/min
Feed per revolution: 1 mm/rev (10% of the drill diameter)

Next, the test results of the second durability test will be explained with reference to the table shown in FIG. 17 and the graph shown in FIG. 18. In the second durability test, when the VB wear width of the outer peripheral corner of the cutting edge 5 reached 0.2 mm, it was considered that the wear was at the durability limit. In the durability test, the number of holes formed within the durability limit and the number of holes formed before edge fracture occurred were compared. As shown in FIGS. 17 and 18, 253 holes were drilled with the drill 18 (refer to FIG. 13) in the fifth test example before fracture occurred on the cutting edge 5. In addition, the durability number for the drill 19 (refer to FIG. 14) in the sixth test example was 3700 holes, the durability number for the drill 20 (refer to FIG. 15) in the seventh test example was 4100 holes, and 667 holes were drilled with the drill 21 (refer to FIG. 16) in the second comparison example before fracture occurred on the cutting edge 5.

As shown by the results of the second durability test, the curvature radius R3 of the corner portion 71 formed at the drill-center side of the thinned portion 7 of the drill 21 in the second comparison example was only 0.004 mm and made a substantially acute angle, and chip room for collecting chips was very little. Accordingly, smooth chip removal could not be allowed and 667 holes were drilled before fracture occurred on the cutting edge. On the other hand, the curvature radius R3 of the corner portion 71 formed at the drill-center side of the thinned portion 7 of the drill 20 in the seventh test example was 0.150 mm, chip room was formed and smooth chip removal could be allowed, so the durability number was 4100 holes. Furthermore, the curvature radius R3 of the corner portion 71 formed at the drill-center side of the thinned portion 7 of the drill 19 in the sixth test example was 0.400 mm, chip room was formed and smooth chip removal could be allowed, so the durability number was 3700 holes. However, the curvature radius R3 of the corner portion 71 formed at the drill-center side of the thinned portion 7 of the drill 18 in the fifth test example was 0.750 mm and 253 holes were drilled before fracture occurred on the cutting edge 5.

Therefore, as indicated by the test results of the second durability test, in a case where the high feed rate machining in which the drill feed per revolution is set to 10% of the drill diameter is performed, it is considered that, in order to improve the durability, the curvature radius R3 of the corner portion 71 formed at the drill-center side of the thinned portion 7 should not make an acute angle or should not be too large. Based on the test results of the above second durability test, it can be judged to be good that the corner portion 71 is formed in an arc shape having a curvature radius of at least 0.1 mm (0.01 times the drill diameter (D), that is, 1%) and not greater than 0.05 times the drill diameter (D) (5% of the drill diameter (D)). More preferably, the corner portion 71 may be formed in an arc shape having a curvature radius of at least 0.15 mm (0.015 times the drill diameter (D), that is, 1.5%) and not greater than 0.04 times (4%) the drill diameter (D).

As described above, with the drill according the above-described embodiments, when the curvature radius R1 of the main cutting edge portion 51 is set to greater than or equal to 0.25 and less than or equal to 1 times the drill diameter (D) and the radial rake angle q of the drill 1 at the outer peripheral portion (outer peripheral corner) of the main cutting edge portion 51 is set to greater than or equal to −60 degrees and less than or equal to −15 degrees, the wear resistance of the outer peripheral portion (outer peripheral corner) of the main cutting edge portion 51 can be improved even in a case where the high feed rate machining in which the drill feed per revolution is set to 10% of the drill diameter is performed. Furthermore, in a case where the curvature radius R3 of the thinning corner portion 71 is set to at least 0.1 mm and not greater than 0.05 times the drill diameter, a sufficient chip room is formed and smooth chip removal can be allowed, so chip welding, accumulation and the like on the chisel edge can be prevented and fracture and the like of the cutting edge can be prevented, so durability of the drill can be improved.

The invention claimed is:

1. A drill in which a flute for removing a chip is formed from a point to a base end side of a body of the drill, on a side face of the body of the drill to be rotated about an axis, a cutting edge is formed at a ridge portion between a wall surface of the flute which faces a drill rotational direction side and a flank at the point of the body of the drill, and a thinned portion is provided to a web portion of the point of the body of the drill, wherein:
the cutting edge is formed in a convex arc shape with a curvature radius being greater than or equal to 0.25 and less than or equal to 1 times a drill diameter;
a radial rake angle at an outer peripheral portion of the cutting edge is greater than or equal to −60 degrees and less than or equal to −15 degrees;
a corner portion, which is closer to the center of the point of the drill, of the thinned portion is formed in an arc shape with a curvature radius of at least 0.1 mm and not greater than 0.05 times the drill diameter;
the drill includes three flutes and three cutting edges; and
a center cutting edge having a linear shape is formed at a portion between the cutting edge and the corner portion of the thinned portion that is on the drill rotational direction side with respect to the cutting edge.

2. The drill according to claim 1, wherein a chisel edge is formed in the point portion of the drill.

3. The drill according to claim 1, wherein the drill is made of ultrahard material.

4. A drill in which a flute for removing a chip is formed from a point to a base end side of a body of the drill, on a side face of the body of the drill to be rotated about an axis, a cutting edge is formed at a ridge portion between a wall surface of the flute which faces a drill rotational direction side and a flank at the point of the body of the drill, and a thinned portion is provided to a web portion of the point of the body of the drill, wherein:
the cutting edge is formed in a convex arc shape with a curvature radius being greater than or equal to 0.25 and less than or equal to 1 times a drill diameter;
a radial rake angle at an outer peripheral portion of the cutting edge is greater than or equal to −60 degrees and less than or equal to −15 degrees;
a corner portion, which is closer to the center of the point of the drill, of the thinned portion is formed in an arc shape with a curvature radius of at least 0.1 mm and not greater than 0.05 times the drill diameter;
the drill includes three flutes and three cutting edges; and
a center cutting edge having an arc shape with a curvature radius larger than the curvature radius of the cutting edge is formed at a portion between the cutting edge and the corner portion of the thinned portion that is on the drill rotational direction side with respect to the cutting edge.

5. The drill according to claim 4, wherein a chisel edge is formed in the point portion of the drill.

6. The drill according to claim 4, wherein the drill is made of ultrahard material.

7. A drill in which a flute for removing a chip is formed from a point to a base end side of a body of the drill, on a side face of the body of the drill to be rotated about an axis, a cutting edge is formed at a ridge portion between a wall surface of the flute which faces a drill rotational direction side and a flank at the point of the body of the drill, and a thinned portion is provided to a web portion of the point of the body of the drill, wherein:
the cutting edge is formed in a convex arc shape with a curvature radius being greater than or equal to 0.25 and less than or equal to 1 times a drill diameter;
a radial rake angle at an outer peripheral portion of the cutting edge is greater than or equal to −60 degrees and less than or equal to −15 degrees:,
a corner portion, which is closer to the center of the point of the drill, of the thinned portion is formed in an arc shape with a curvature radius of at least 0.1 mm and not greater than 0.05 times the drill diameter;
the drill includes three flutes and three cutting edges; and
a portion between the cutting edge and the corner portion of the thinned portion that is on the drill rotational direction side with respect to the cutting edge is formed such that the cutting edge connects to a first center cutting edge having a linear shape, the first center cutting edge connects to a second center cutting edge having an arc shape, and the second center cutting edge connects to the corner portion of the thinned portion.

8. The drill according to claim 7, wherein a chisel edge is formed in the point portion of the drill.

9. The drill according to claim 7, wherein the drill is made of ultrahard material.

* * * * *